US012808435B2

(12) United States Patent
Cullinane et al.

(10) Patent No.: US 12,808,435 B2
(45) Date of Patent: Nov. 24, 2026

(54) SEAL FOR AN ELECTRONIC DEVICE

(71) Applicant: Apple Inc., Cupertino, CA (US)

(72) Inventors: Devinne Cullinane, San Francisco, CA (US); Andrew R Saville, Santa Clara, CA (US); Edward S Huo, Sunnyvale, CA (US); Ritu Shah, Sunnyvale, CA (US); Teodor Dabov, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 79 days.

(21) Appl. No.: 18/861,996

(22) PCT Filed: Jun. 1, 2023

(86) PCT No.: PCT/US2023/024205

§ 371 (c)(1),
(2) Date: Oct. 31, 2024

(87) PCT Pub. No.: WO2023/235523

PCT Pub. Date: Dec. 7, 2023

(65) Prior Publication Data

US 2025/0283533 A1 Sep. 11, 2025

Related U.S. Application Data

(60) Provisional application No. 63/365,759, filed on Jun. 2, 2022.

(51) Int. Cl.
*F16J 15/06* (2006.01)
*G06F 1/16* (2006.01)

(52) U.S. Cl.
CPC .............. *F16J 15/06* (2013.01); *G06F 1/163* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,385,060 | B2 * | 2/2013 | Dabov | G06F 1/169 361/679.55 |
| 11,592,870 | B2 * | 2/2023 | Parker | G06F 1/163 |
| 11,681,327 | B2 * | 6/2023 | Crowley | G06F 1/163 381/388 |
| 12,093,359 | B2 * | 9/2024 | Koch | G06F 21/32 |
| 12,652,341 | B2 * | 6/2026 | Monaco | G06F 3/016 |
| 2011/0051360 | A1 * | 3/2011 | Dabov | H04R 31/00 361/679.55 |

(Continued)

OTHER PUBLICATIONS

PCT International Search Report and Written Opinion for PCT International Application No. PCT/US2023/024205, mailed Nov. 16, 2023 (20 pp.).

*Primary Examiner* — Lisa Lea-Edmonds
(74) *Attorney, Agent, or Firm* — Dorsey & Whitney LLP

(57) ABSTRACT

An electronic device includes housing having a first wall and a second wall, the first and second walls defining an enclosure. A base support is disposed in the enclosure and defining a first surface and a second surface opposite the first surface. The first surface is coupled to the first wall. A light emitting component is coupled to a second surface of the base support. A seal surrounding the light emitting component is disposed between the base support and the second wall. The second wall is disposed over the base support.

7 Claims, 7 Drawing Sheets

(56) References Cited

U.S. PATENT DOCUMENTS

| | | | | |
|---|---|---|---|---|
| 2012/0275160 | A1* | 11/2012 | Tada | H04M 19/048 362/267 |
| 2015/0114090 | A1* | 4/2015 | Fukuda | F21V 33/0052 362/253 |
| 2021/0329108 | A1* | 10/2021 | Jia | G06F 1/1626 |
| 2023/0139537 | A1* | 5/2023 | Chiang | G06F 1/163 361/679.03 |
| 2024/0397032 | A1* | 11/2024 | Rockwell | G06F 3/017 |
| 2025/0004501 | A1* | 1/2025 | Shah | G02B 27/0176 |
| 2025/0093665 | A1* | 3/2025 | Cincione | G02B 27/0176 |
| 2025/0283533 | A1* | 9/2025 | Cullinane | G06F 1/1616 |

* cited by examiner

SEAL FOR AN ELECTRONIC DEVICE

CROSS-REFERENCE TO RELATED APPLICATION(S)

This application is a National Stage filing based off of PCT Application No. PCT/US2023/02420, filed 1 Jun. 2023, and entitled "SEAL FOR AN ELECTRONIC DEVICE" which claims priority to U.S. Provisional Patent Application No. 63/365,759, filed 2 Jun. 2022, and entitled "SEAL FOR AN ELECTRONIC DEVICE," the entire disclosure of which is hereby incorporated by reference.

FIELD

The described embodiments relate generally to the protection of electronic devices and components therein. More particularly, the present embodiments relate to dust seals that separate electrical components and are configured to aid assembly.

BACKGROUND

Electronic devices can include internal components that communicate, interface, or interact with the environment external to the device in some way. Often, these internal components can be negatively affected by the external environment, including interference from external light and dust. Such components can also interfere with each other and negatively affect their intended functions. Further, the components are susceptible to degradation due to dust and debris or light interference.

However, traditional electronic devices and components are not designed adequately to withstand external forces while protecting the internal components from both dust damage and light interference. In addition, traditional designs attempting to mitigate such interferences make it difficult or expensive to assemble the electronic device. Furthermore, traditional designs tend to be heavy and can be bulky or lack aesthetically and tactilely pleasing design features.

SUMMARY

An electronic device can include a housing including a first wall and a second wall, the first and second walls defining an enclosure. The device can also include a base support disposed in the enclosure and defining a first surface and a second surface opposite the first surface. The first surface can be coupled to the first wall. A light emitting component can be coupled to a second surface of the base support. The electronic device can further include a seal surrounding the light emitting component disposed between the base support and the second wall. In some examples, the second wall can be disposed over the base support. In some examples, an electronic component can be disposed between the first wall and the second wall, and the seal can separate the electronic component from the light emitting component. The base support can include a ledge. In some examples, the seal can surround an upper portion of the base support and can contact the ledge. The seal and the base support can be engaged in an interference fit.

In some examples, the seal can include a plastic shim that contacts the base support and a foam material coupled to the plastic shim with a pressure sensitive adhesive. The foam material can be compressed between the plastic shim and the second wall. In other examples, the seal can include a silicone material. The seal can obstruct light having wavelengths between about $10^{-8}$ m to about $10^{-3}$ m and inhibit dust and/or debris from traversing between the base support and the second wall. In some examples, the seal can be die cut.

In some examples, a head mountable electronic device can include a housing having an internal wall defining an interior surface and an external wall defining an external surface. The head mountable electronic device can further include a first enclosure defined by the internal wall and the external wall, a second enclosure defined by the internal wall and the external wall, and a third enclosure defined by the internal wall. A light emitting component can be disposed in the first enclosure and a light sensitive component can be disposed in the second enclosure. A metal or a plastic base support can be disposed in the third enclosure, the base support including a top surface. The electronic device can further include a seal coupled to the top portion of the base support. The seal can separate the first enclosure, the second enclosure, and the third enclosure. In some examples, the seal can be impenetrable to dust, debris, and light. In some examples, the light emitting component can include a light emitting diode. In some examples, the light sensitive component can include at least one of a camera, an ambient light sensor, or a flicker sensor.

In some examples, the seal can include a compressible foam. In some examples, the seal can extend from the base support and through the internal wall to the exterior surface of the housing. In some examples, the electronic device can further include a flexible printed circuit board disposed between the seal and the base support, the seal retaining the flexible printed circuit board adjacent the base support. In some examples, at least one of the interior surface and external surface of the housing can include an air vent. In some examples, the light emitting component can be coupled to a top surface of the base support. The base support can include a ledge. In some examples, the seal can surround an upper portion of the base support, the seal having a plastic shim contacting the ledge.

In some examples, an electronic device can include a dust seal coupled to a base support. The dust seal can couple to the support in an interference fit. The electronic device can also include a flexible printed circuit board disposed between the dust seal and the base support. In some examples, the dust seal can retain the flexible printed circuit board adjacent the base support. In some examples, the flexible printed circuit board can be coupled to a light emitting device mounted to the base support. In some examples, the dust seal can encircle the light emitting device and the dust seal can be impenetrable to light and dust. In some examples, the dust seal can include a plastic shim and a foam portion, the plastic shim having a bottom surface coupled to the base support with a pressure sensitive adhesive and a top surface coupled to the foam portion with the pressure sensitive adhesive. The foam portion can include a compressible open or closed cell foam. In some examples, the base support can include a ledge and the dust seal can surround an upper portion of the base support and the plastic shim can contact the ledge.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
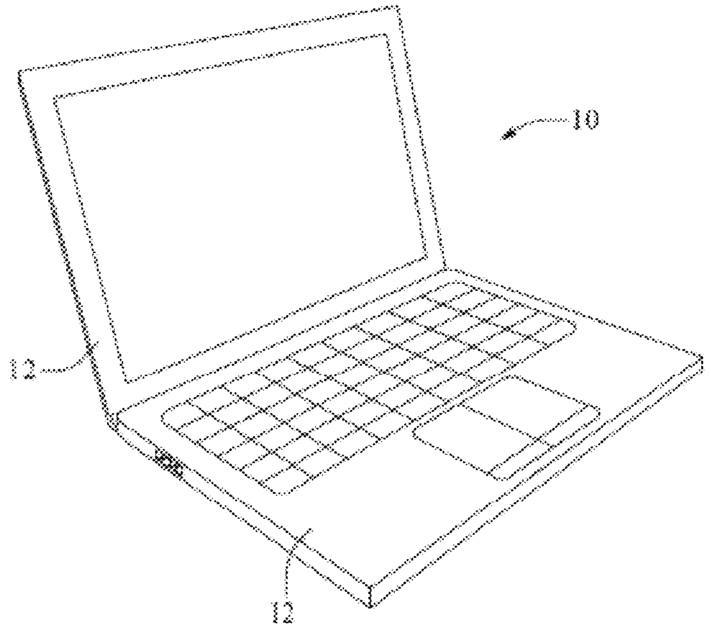
FIG. 1 shows an example of an electronic device.

Reference will now be made in detail to representative examples illustrated in the accompanying drawings. It should be understood that the following descriptions are not intended to limit the examples to one preferred example. To the contrary, it is intended to cover alternatives, modifications, and equivalents as can be included within the spirit and scope of the described examples as defined by the appended claims.

The following disclosure relates to seals, electronic components protected by the seals, and arrangements for electronic components within electronic devices. Examples of electronic devices described herein include portable electronic devices and personal computing devices designed to be used in a variety of environments. For example, many people carry mobile phones on their person throughout the day and night, including during outdoor activities or inside an office or home. Electronic watches are also worn and used in many environments including outdoors while recreating, submerged in water, in the rain, under the sun, and so forth. A more recent technological development is the use of virtual reality and/or alternate reality (VR/AR) headsets that can be worn and used inside or outside and during the day or night.

Any of these examples of electronic devices can include a number of components that interact with the external environment. These components can include sensors, antennas, cameras, or other similar electronic components. In the example of the AR/VR headset given above, one or more sensors can include tracking sensors, ambient light sensors, and/or flicker sensors. Also, one or more outward facing lights, such as light-emitting diodes (LEDs) can be placed and tracked with an external camera to develop accurate positioning of the VR/AR headset and/or other components.

The electronic devices described in the present disclosure include components and arrangements configured to protect the LEDs, antennas, sensors, and/or other components communicating with the external environment noted above, from light and debris that may otherwise harm or negatively affect the components. More specifically, the present disclosure describes seals and electronic components that ensure internal components can sufficiently function without interference from an environment external to the electronic device, as needed, without the risk of damage to the internal component. Such interferences can include light, debris, or moisture. Such internal components can include, but are not limited to, cameras, LEDs, ambient light sensors, flicker sensors, and other sensors, and the like. These and other internal components can be disposed adjacent to, or aligned below, one or more apertures/ports of the electronic device, with a seal disposed between the aperture/vent and the internal electronic component. In this way, the seals described herein can act as a barrier between the internal component and the external environment or the internal component and other internal components while also enabling the proper functioning of the internal component.

In a particular example, an electronic device includes a housing that defines an internal volume and an aperture defined by the housing. An electronic component can be disposed within the internal volume and a seal can be disposed between the aperture and the electronic component, the seal being configured to protect the electronic component within the housing.

In a particular example, an electronic component can include a light emitting component coupled to a base support. The electronic device can include other electronic components that are light sensitive. The seal can be disposed and configured between the light emitting component and light sensitive component to prevent and/or minimize light interference.

The seals described herein obstruct light having wavelengths in the visible range, as well as those having wavelengths extending into to ultraviolet and infrared ranges. The seals also inhibit dust and/or debris from traversing into the housing from apertures and/or any vents disposed on the housing of the electronic device. The seals described herein are also compressible to aid in assembly of the electronic device. In addition, the seals and assemblies described herein are durable and resistant to damage. The seal can be die cut and the components of the electronic device can be made of materials intended to minimize the weight of the components and/or the electronic device.

For example, a seal described herein can include an open or closed cell foam. The seal can engage a bracket or base support of the electronic device in an interference fit. In some examples, the seal can include a seal configured to surround the light emitting component. Because the light emitting component is mounted to an end of the base support in some examples, the seal can be die cut to have a precise interference fit with the base support to separate the light emitting component from other electronic components disposed in the electronic device and to facilitate a top-down assembly orientation.

These and other examples are discussed below with reference to FIGS. 1-7C. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

In the present disclosure, any example of an electronic device that incorporates the housing, enclosures, electronic components, seals, and configurations described herein can incorporate the present teachings and methods. The figures herein are for illustrative purposes only to show an example implementation of the device and the electronic components and configurations of the present disclosure. The seals, base supports, housing, and seal/enclosure configurations can be implemented in any number of electronic devices. Examples of electronic components, seal components, and device configurations disclosed herein can be included in any number of electronic devices, including but not limited to desktop computers, laptop computers, tablets, smartphones, smart speakers, wearable electronic devices such as fitness trackers, smart watches, head-mountable-display devices or other alternate/virtual reality devices, and so forth.

FIG. 1 illustrates an example of an electronic computing device 10 having a compact design. The device 10 is a laptop computer having multiple functions, including visual and audio outputs, internet connectivity, electronic communication capabilities, and computing functionalities. These functions can be enabled by a multitude of components, including processors, antennas, display components, screens, and lights, input components such as keyboards and touchpads, and so forth. Many of these electronic components can include sensors and/or light-emitting components that can interfere with nearby components of the device 10. These components can be isolated by the present exemplary systems and methods for proper operation.

In one example, the device 10 can include a housing 12 or multiple housings defining an internal volume. The sensors and/or light-emitting components can be disposed within the internal volume or outside the internal volume. In on example, the components can communicate with the ambient environment through the housing. For example, the light-emitting component can be an LED disposed at or on the housing 12, or within the housing 12 and directing light through an aperture defined by the housing 12. The sensor components and systems described herein can be disposed within the internal volume defined by the housing 12. Another exemplary electronic device is detailed below with reference to FIG. 2.

Figure 2:
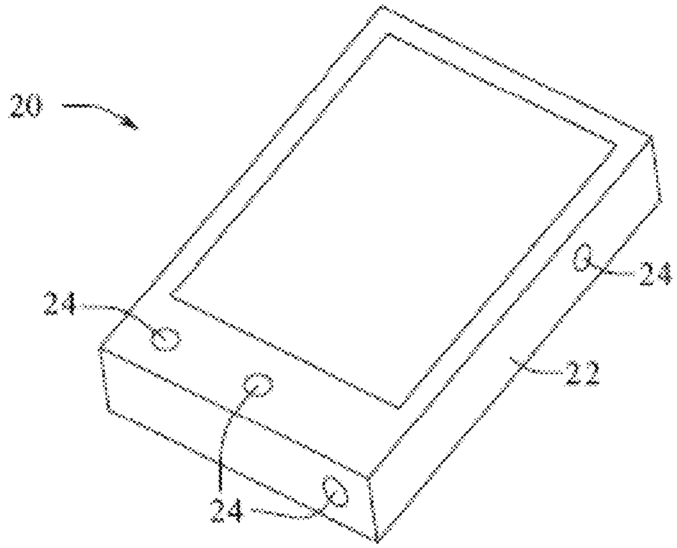
FIG. 2 shows another example of an electronic device.

FIG. 2 shows another example of an electronic device 20, including a smartphone having a housing 22 defining an internal volume and an external surface of the device 20. The smartphone 20 can also include a number of electronic components, including display/touch screens, and/or sensors and one or more lights 24 can be disposed at various locations on, above, or within the housing 22 as shown. In one example, the lights 24 can be notification lights or visual icons disposed within the internal volume or outside the internal volume defined by the housing 22 of the device 20. In on example, the lights 24 can communicate with the ambient environment through the housing 22. For example, one or more of the lights 24 can be an LED disposed at or on the housing 22, or within the housing 22, and directing light through an aperture defined by the housing 22.

In the illustrated example of FIG. 2, the lights 24 can include LEDs that can interfere with light-sensitive components. The light-emitting and light sensitive components and systems described herein can be included in the smartphone 20 while being isolated from each other to prevent degradation and interference of the light sensitive components by the light-emitting components. Another exemplary electronic device is detailed below with reference to FIG. 3.

Figure 3:
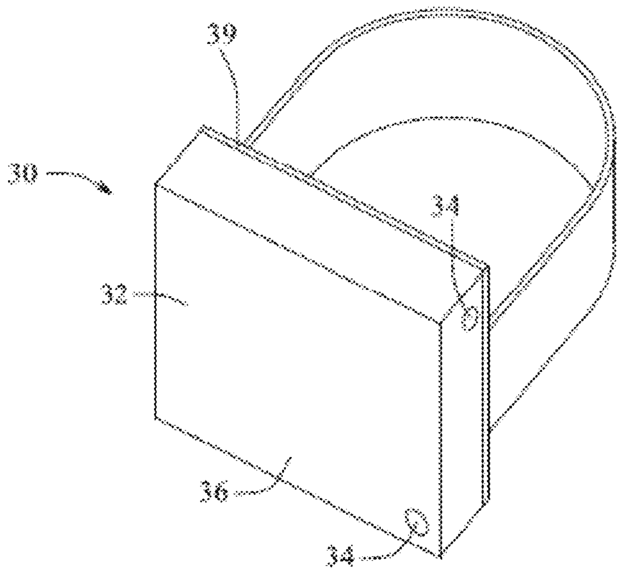
FIG. 3 shows yet another example of an electronic device.

FIG. 3 shows another example of an electronic device, including a head-mountable display 30 having a display portion 36. The display portion 36 can include a housing 32 defining an internal volume and one or more light emitting and/or light sensitive electronic components, including outward facing lights 34. The display portion 36 can also include a display screen 39 or other display component projecting light toward the user's eyes when the user dons the head-mountable display 30. The lights 34 can include one or more LEDs. The lights 34 and/or light sensitive components can be disposed at various locations on, above, or within the housing 32 as shown. In one example, the lights 34 can be notification lights or visual icons disposed within the internal volume or outside the internal volume defined by the housing 32 of the head-mountable display 30. In one example, the lights 34 can communicate with the ambient environment through the housing 32. Light sensitive components can include ambient light sensors, cameras, and/or flicker sensors. One or more of the lights 34 can be an LED disposed at or on the housing 32, or within the housing 32 and directing light through an aperture defined by the housing 32. In other embodiments, the lights 34 can be infrared or other non-visible lights used to aid sensors or other components of the head-mountable display 30 by illuminating objects with light of a known frequency.

Any of the features, components, and/or parts, including the arrangements and configurations thereof shown in FIGS. 1-3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 1-3. Further details of the present sealing systems and methods are provided below with reference to FIG. 4.

Figure 4:
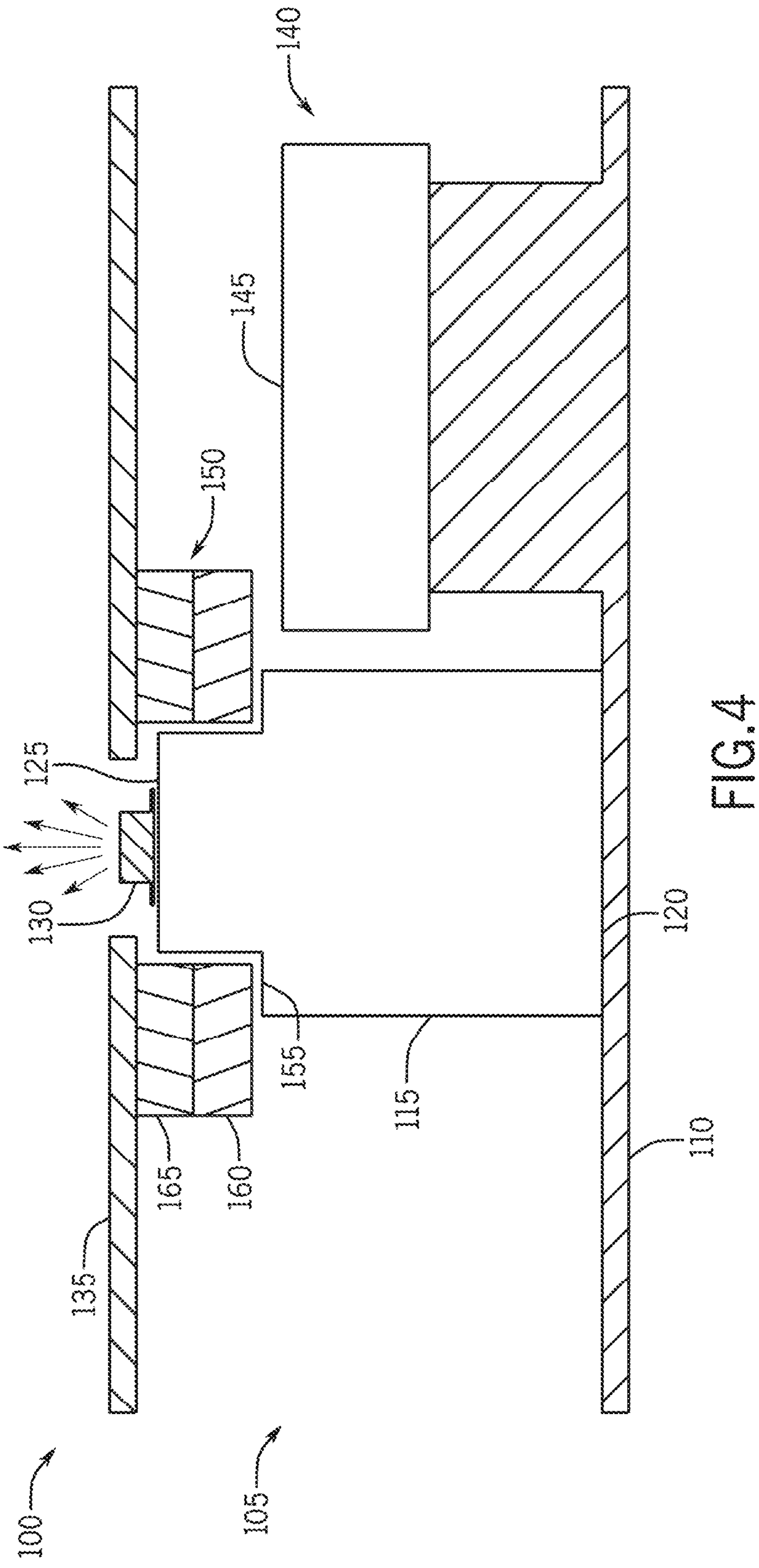
FIG. 4 shows a cross-sectional view of a portion of an electronic device, according to an example.

FIG. 4 illustrates a cross-section of an electronic device 100. The electronic device can include any of the electronic devices described above. The electronic device can include a housing 105. The housing can include a first wall 110. In some examples, the first wall 110 can include an exterior wall of the electronic device 100 or can include a wall that separate chambers or compartments within electronic device 100. The housing 105 can include a base support 115 coupled to the first wall 110. The base support 115 can include a base bracket or support piece for the electronic device 100 and/or electronic components disposed within the housing 105. In some examples, the base support 115 can include one or more stiff metal materials, including steel, stainless steel, magnesium, and/or titanium. In some examples, the base support 115 can include plastic and/or plastic components to reduce weight of the electronic device 100. The base support 115 can be cylindrical shaped or can include a cubic shape and may be a solid material or hollow to reduce weight of the electronic device 100. The base support 115 can include a first surface 120 coupled to the first wall 110 by adhesive or any non-limiting fastening method and/or device. An electronic component can be coupled to a second surface 125 of the base support 115. The second surface 125 of the base support 115 can be configured opposite the first surface 120. The electronic component can include a light emitting component 130 (e.g., a light emitting diode or LED).

The electronic device 100 can further include a second wall 135 disposed over the base support 115. The first wall 110 and the second wall 135 can form an enclosure 140 within the housing 105 and the base support 115 can be disposed within the enclosure 140. In some examples, an electronic component 145 can also be disposed within the enclosure 140. The electronic component 145 can include a light sensitive component, in some examples, subject to light interference from the light emitting component 130. The electronic component 145 can be mounted to a second base support or can be coupled to either the first wall 110 and/or the second wall 135 directly.

The electronic device 100 can further include a seal 150 surrounding the light emitting component 130. The seal 150 can be disposed between the base support 115 and the second wall 135. In some examples, the seal 150 separates the electronic component 145 from the light emitting component 130. The seal 150 can be configured to obstruct light having wavelengths between about $10^{-8}$ m and about $10^{-3}$ m. In other words, the seal 150 can obstruct light in the visible region, the ultraviolet region, and the infrared region. The seal 150 can also inhibit dust and/or debris from traversing between the base support 115 and the second wall 135. In some examples, the seal 150 surrounds the light emitting component 130 on all sides. As such, the seal 150 engages the base support 115 either around a perimeter of an upper portion of the base support 115 or the second surface 125 of the base support 115. In some examples, the second surface 125 includes the same surface having the light emitting component 130 disposed thereon.

In some examples, the base support 115 defines a ledge 155. The seal 150 can surround an upper portion of the base support 115 and contact or engage an upper surface of the ledge 155. As such, the seal 150 and the base support 115 can be engaged in an interference fit. For example, the radial seal 150 can be disposed in a press fit or friction fit between the base support 115 and the second wall 135. The seal 150 and the base support 115 can be held together by friction after the housing 105 and other components are assembled. For example, the seal 150 can be compressed between the second wall 135 and the second surface 125 or the ledge 155 of the base support 115 to separate or seal the light emitting component 130 from the electronic component 145. In some examples, the seal 150 can separate and/or seal off the enclosure 140 from an area or environment outside the housing 105 or external to the electronic device 100.

In some examples, the seal 150 can be die cut. The seal 150 can be cut into a precise shape by a metal "die" during production. Because of the precise shape (e.g., radial) and dimensions of the seal 150 to properly seal against light, dust, and other debris and to fit properly against the second wall 135 and the base support 115, including the ledge 155 defined thereby, the die cutting process can provide the exact shape and properties of the seal 150 for proper assembly of the electronic device 100.

In some examples, the seal 150 can include a silicone material. The silicone seal 150 can be manufactured inexpensively and when shaped appropriately, provide the required compressibility and interference fit to the base support 115. In some examples, the silicone seal 150 can include a foaming agent and/or be dyed to obstruct light from passing through from either the external environment and/or the light emitting component 130 to the electronic component 145 within the enclosure 140. The seal 150 can include portions formed of different materials. In some examples, the seal 150 can include a plastic shim 160. The plastic shim 160 can be included as a component of the seal 150 to reduce weight of the seal 150, and thus, can reduce the weight of the electronic device 100. In some examples, the plastic shim 160 can contact the base support 115. In some examples, the plastic shim 160 can contact the ledge 155 and/or the upper portion of the base support 115. The plastic shim 160 can also be impenetrable or resistant to light, dust, and/or debris. The seal can further include a foam material 165 coupled to the plastic shim 160.

Any of the features, components, and/or parts, including the arrangements and configurations thereof shown in FIG. 4 can be included, cither alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 4. Further details of the seal are provided below with reference to FIG. 5.

Figure 5:
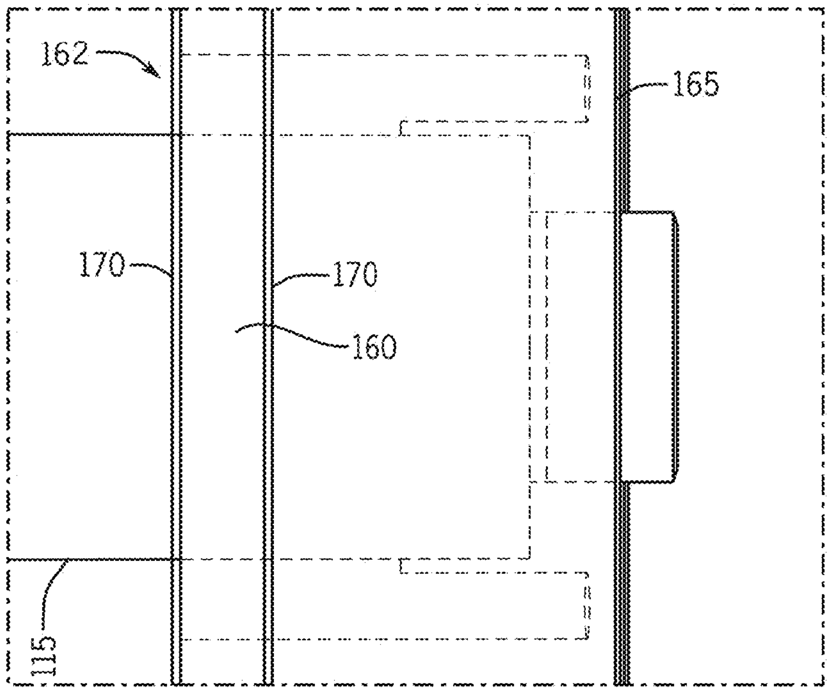
FIG. 5 shows a cross-sectional view of a seal, according to an example.

Referring now to FIG. 5, a cross-section of the seal 150 illustrated in FIG. 4 is shown. In some examples, the plastic shim 160 can be coupled to the foam material 165 with a pressure sensitive adhesive 170, or any suitable adhesive. The plastic shim 160 can form a precision seal with the base support 115 and can be less expensive to manufacture than the silicone and/or a seal including only foam material. The foam material 165 can be compressed between the plastic shim 160 and the second wall 135, as shown in FIG. 4. The plastic shim 160 can include a bottom surface 162 coupled to the base support 115. The plastic shim 160 can be joined to the base support 115 with the pressure sensitive adhesive 170. A top surface of the plastic shim 160 can also include a pressure sensitive adhesive 170 to couple the plastic shim 160 to the foam material 165. In some examples, the foam material 165 can include a compressible open or closed cell foam to inhibit light, dust, and/or debris.

Any of the features, components, and/or parts, including the arrangements and configurations thereof shown in FIG. 5 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 5. Additional configurations of the seals described herein are provided below with reference to FIGS. 6-7C.

Figure 6:
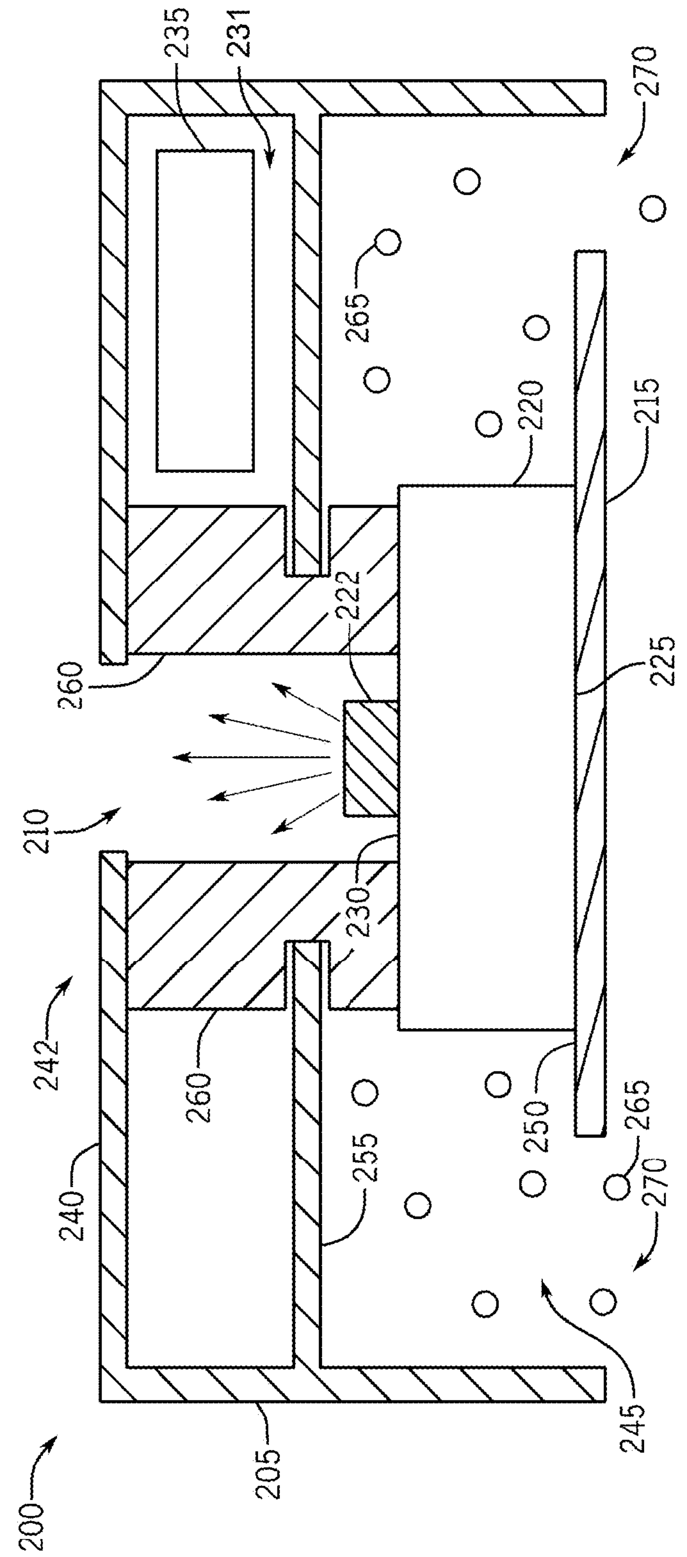
FIG. 6 shows a cross-sectional view of an electronic device, according to an example.

FIG. 6 illustrates an electronic device 200 having a housing 205 and electronic components therein. The electronic device 200 can include a head mountable device (e.g., device 30). In some examples, the electronic device 200 can include a first enclosure 210 having a light emitting component 222 disposed therein. The first enclosure can be defined, at least in part, by the housing 205, an internal wall 255, and an external wall 240 defining an external surface 242. The housing 205 can include a first wall 215. In some examples, the first wall 215 can include an exterior wall of the electronic device 200 or can include a wall that separates chambers or compartments within the electronic device 200. The housing 205 can include a base support 220 coupled to the first wall 215. The base support 220 can include a first surface 225 coupled to the first wall 215 by an adhesive or any non-limiting fastening method and/or device. An electronic component can be coupled to a second surface 230 of the base support 220. The second surface 230 of the base support 220 can be opposite the first surface 225. The light emitting component 222 can include a light emitting diode (LED).

The housing 205 can further include a second enclosure 231. The second enclosure 231 can include at least one light sensitive component 235 disposed therein. The second enclosure 231 can be defined by the housing 205, including various internal and external walls. In some examples, the light sensitive component 235 can include an optically sensitive device. In some examples, the light sensitive component 235 can include at least one of a camera, an ambient light sensor, or a flicker sensor. In some examples, the second enclosure 231 can include an exterior surface 240 of the housing 205. In other words, one of the walls of the second enclosure 231 includes the exterior surface 240 of the housing 205.

In some examples, the housing 205 can further define a third enclosure 245. The base support 220 can be disposed within the third enclosure 245. In some examples, the base support 220 can include a metal or plastic material. In some examples, the third enclosure 245 can include an interior surface 250 of the housing 205. In other words, one of the walls of the third enclosure 245 includes the interior surface 250 of the housing 205. In some examples, the housing 205 of the electronic device 200 includes an internal wall 255 separating at least a portion of the second enclosure 231 and the third enclosure 245. In some examples, a seal 260 is included. The seal 260 can be coupled to a top portion or the second surface 230 of the base support 220. The seal 260 can separate the first enclosure 210, the second enclosure 231, and the third enclosure 245. In other words, the seal 260 includes at least a portion of a wall or divider that separates the first enclosure 210, the second enclosure 231, and the third enclosure 245 from each other. In some examples, the seal 260 is impenetrable to dust, debris, and/or light. The seal can extend from the second surface 230 of the base support 220 past the internal wall 255 and press fit to the exterior surface 240 of the housing 205. In such a configuration as shown in FIG. 6, the seal 260 functions to both protect the light sensitive component 235 from the light emitting component 222 and protects both the light sensitive component 235 and the light emitting component 222 from debris and/or dust 265 present either outside the housing 205 or within the third enclosure 245.

In some examples, the dust 265 can ingress into the third enclosure 245 through an air vent 270 or other aperture. The seal 260 prevents or substantially prevents the dust 265 or other debris, such as, but in no way limited to, water, dirt, and smoke, from passing through to the first enclosure 210 or second enclosure 230, which can include sensitive electronic components. The air vent 270 can be included on the electronic device 200 for temperature control and/or heat dissipation. In some examples, the air vent 270 can be included for comfort and/or safety for the user of the electronic device 200. According to one example, the air vent 270 can include a perforated material to cover the air vent 270 or other apertures in the electronic device. The size, locations, and number of perforations extending through such a material can vary from one example to another. Such perforations can include machined, laser cut, or otherwise manufactured openings defined by and extending through the material. Such openings can be sized and arranged to prevent a certain size particle from the external environment from passing through the air vent 270. Such openings can also be sized and include other types of filters to prevent moisture or other harmful debris from passing through the air vent 270.

In some examples, the seal 260 can be cut and/or shaped to seal around the internal wall 255 and between the second surface 230 of the base support 220 and the exterior surface 240 of the housing 205. The seal 260 can include a compressible foam and can compress in an interference or press fit between the exterior surface 240 of the housing 205 and a top portion or the second surface 230 of the base support 220. The seal 260 can include an open cell polyurethane foam, which is lightweight and more compressible compared to a closed cell foam. In other examples, the seal 260 can include a silicone material. The seal 260 can include a reticulated Polyurethane, PVC/Nitrile, Ethylene Propylene Diene Monomer (EPDM) rubber, or other suitable material. The materials which can be used to produce the closed cell foam for the seal 260 can vary greatly from ethylene-vinyl acetate (EVA), polyethylene, polystyrene, rubber to polypropylene etc. The closed cell foam can include trapped gas bubbles which are formed during the expansion and cure of the foam. The bubbles are permanently locked to a place, as the trapped gas is very efficient in increasing the insulation capability of the foam. The foam which is formed is strong and is usually of a greater density than open cell foam, which enables the gas bubbles to lock into place. The nature of the foam enables it to be vapor retardant and resist liquid water. In some examples, the materials for the seal can be open celled, but can include a sufficiently tortuous path so as to restrict or eliminate the passage of contaminants between enclosures.

In some examples, the top portion of the base support 220 can include a ledge (e.g., ledge 155 shown in FIG. 4). The seal 260 can surround an upper portion of the base support 220 and contact the ledge. In some examples, the seal 260 can further include a plastic shim (e.g., plastic shim 160) that contacts the ledge. The seal 260 can fit tightly to the base support 220. The tight fit can function not only to seal the enclosures within the housing, but also to control and/or retain electronic components in place, which can improve the design of the electronic device 200, minimize noise and/or vibrations, and reduce manufacturing costs.

Any of the features, components, and/or parts, including the arrangements and configurations thereof shown in FIG. 6 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 6. Further details of an electronic device incorporating the present arrangements is provided below with reference to FIGS. 7A-7C.

Figure 7A:
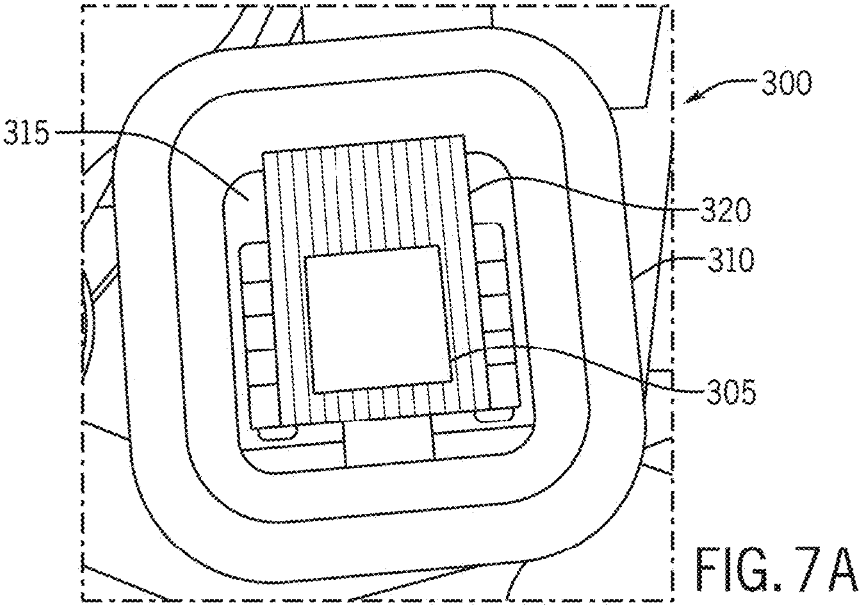
FIG. 7A shows a top perspective view of an electronic component and a seal, according to an example.
Figure 7B:
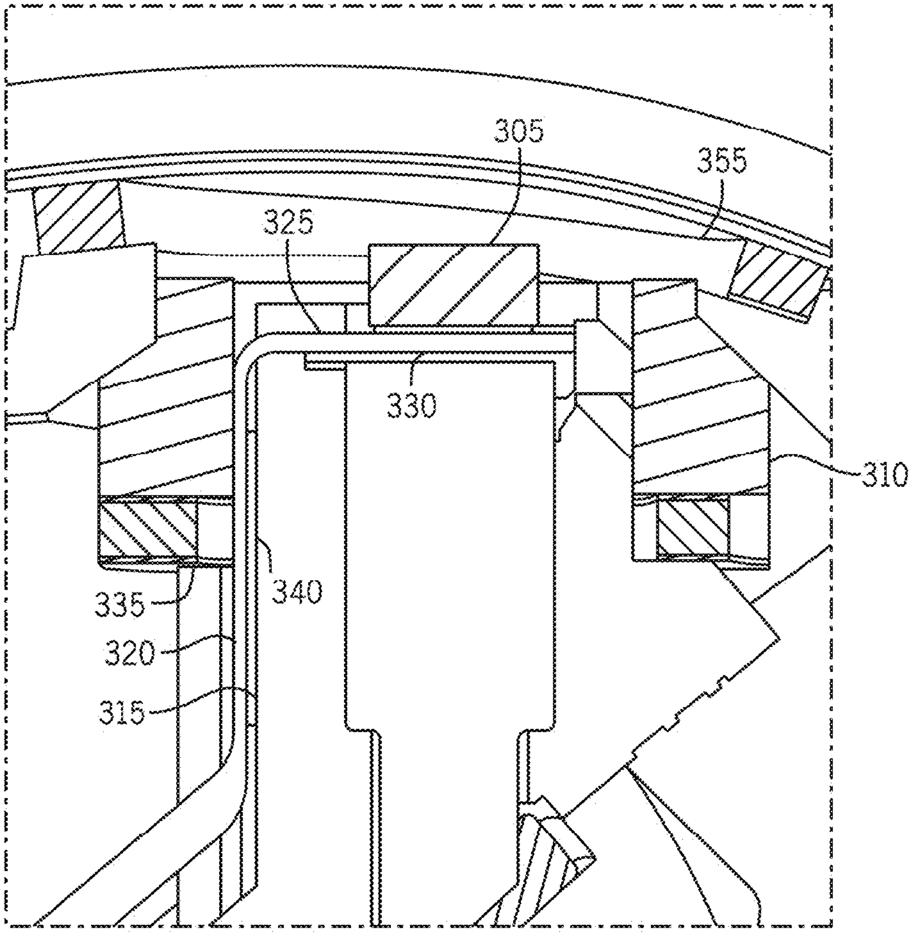
FIG. 7B shows a cross-sectional view of a portion of an electronic device, according to an example.
Figure 7C:
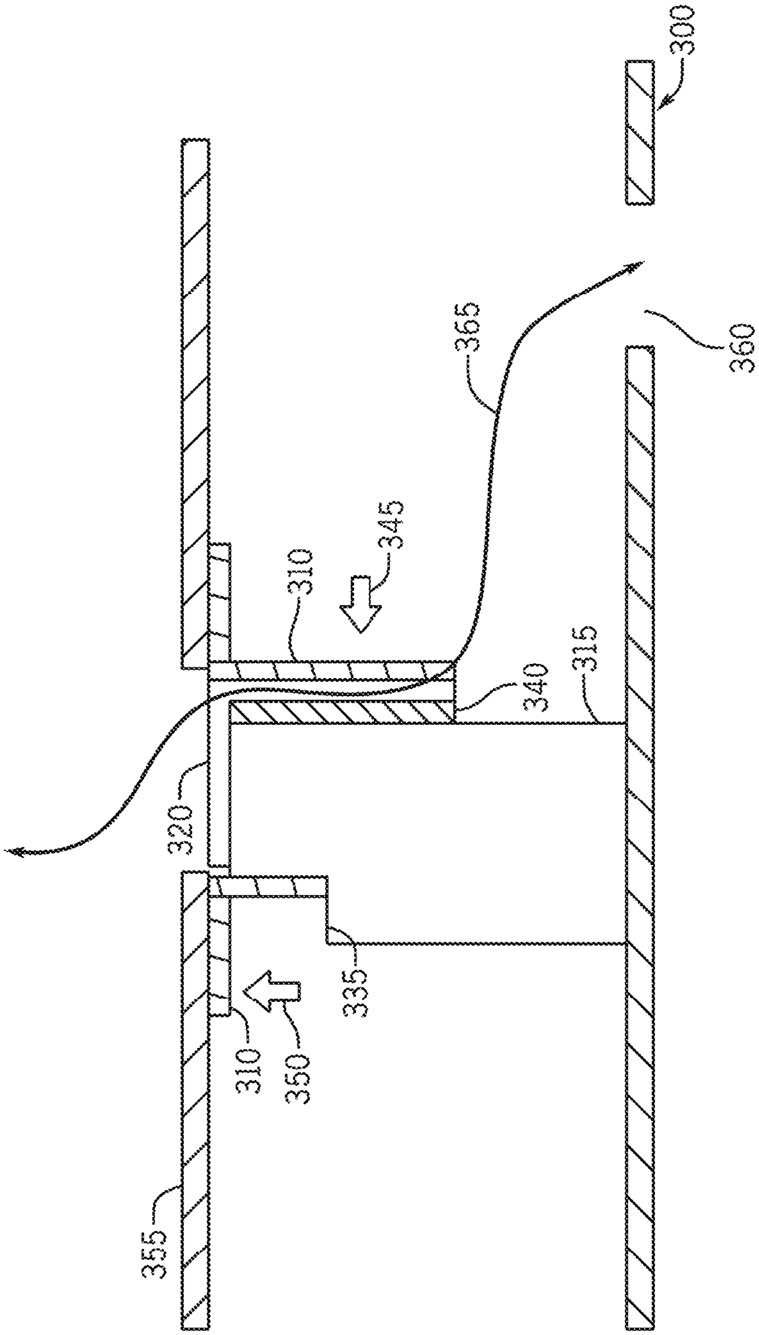
FIG. 7C shows a cross-sectional view of a portion of an electronic device, according to an example.

FIGS. 7A-7C illustrate an electronic device 300. FIG. 7A shows a top perspective view of an electronic component 305 and a dust seal 310 surrounding the electronic component 305 within the electronic device 300, according to one example. In some examples, the dust seal 310 can be coupled to a base support 315. The dust seal 310 can couple to the base support 315 via an interference fit. In some examples, the dust seal 310 can be adhered to the base support 315 with an adhesive (e.g., pressure sensitive adhesive 170 shown in FIG. 5). In some examples, the electronic component 305 can include a light emitting component (e.g., light emitting component 222 shown in FIG. 6). The electronic device 300 can further include a flexible printed circuit board or flexible printed circuit (flex PCB) 320. At least a portion of the flex PCB 320 can be disposed between the dust seal 310 and the base support 315. In some examples, a flex PCB can include an arrangement of printed circuitry and/or components that utilize flexible materials with a flexible overlay. A flexible printed circuit board can include a metallic layer of traces, usually copper, bonded to a dielectric layer. Thickness of the metallic layer can be very thin (<0.0001") to very thick (>0.010") and the dielectric thickness can also vary. The flex PCB can be included in the electronic device 300 to reduce the assembly process and improve reliability. The flex PCB can be used as a connector, power supply, and also as full circuits assembled with components such as electronic component 305. A benefit of including the flex PCB 320 in the electronic device 300 is connecting the electronic component 305 to other components and/or a power source (not shown) and having the flex PCB 320 disposed between the dust seal 310 and the base support 315. In some examples, the dust seal 310 retains the flex PCB adjacent to the base support 315.

FIG. 7B shows a cross-sectional view of a portion of electronic device 300. The flex PCB 320 can be coupled to the electronic component 305. In some examples, electronic component 305 can include a light emitting device mounted to the base support 315. In some examples, the light emitting device can be coupled to a top surface 325 of the flex PCB 320 and a bottom surface 330 of the flex PCB 320 can be coupled to the base support 315. The dust seal 310 can encircle the light emitting device. In some examples, the dust seal 310 is impenetrable or resistant to light, dust, and/or debris. FIG. 7B shows the base support 315 having a ledge 335. The dust seal 310 can extend from the upper portion of the base support 315 adjacent to the base support 315 and past the dust seal 310. In some examples, the ledge 335 can include a cut-out portion. The cut-out portion can have the width of the flex PCB to minimize folding of the PCB and retain the flex PCB 320 adjacent to the base support 315. Referring to FIG. 7C, the flex PCB 320 can further include an adhesive 340 on the bottom surface 330 to retain the flex PCB 320 adjacent to the base support 315. FIG. 7C shows components of the dust seal, each component configured to retain the flex PCB 320 and/or prevent dust and/or debris ingress into the electronic device.

In some examples, the dust seal 310 can act as a radial seal to apply a radial force 345 to the flex PCB 320 to retain the flex PCB 320 adjacent the base support 315. In other words, the dust seal 310 prevents ingress path and aids adhesive 340 in flex management by applying compressive normal force that keeps the flex PCB 320 from delaminating from the base support 315. The dust seal 310 can also act as a compressive seal to apply a compressive force 350 to compress the dust seal 310 between a housing wall 355 and the base support 315. As such, the dust seal 310 can include a compressible foam. The dust seal 310 can be coupled to the base support 315 and engaged to the base support and the housing wall 355 in an interference fit. As described in other examples above, the housing wall 355 of the electronic device 300 can include a vent 360 and/or other apertures. FIG. 7C includes the dust ingress route 365 that the dust seal 310 is configured to prevent. Because the dust seal 310 includes a compressible foam and is engaged in a compressive seal and a radial seal, the dust ingress route 365 is closed off, the dust seal 310 being impenetrable to dust and/or debris. In some examples, the dust seal 310 is also impenetrable to light.

In some examples, the components described above for the electronic device examples (e.g., electronic device 100, 200, and/or 300) can aid in the assembly of the electronic device housing (e.g. housing 305). The assembly process can, in some examples, demand the use of a minimal amount of metal material for the base support 315 to maximize the available distance that can be used between the components. The assembly methods can also demand that the ledge 335 be minimized so that the base support 315 does not interfere with the inclusion/installation of other electronic components (e.g., electronic component 145) during assembly. In other words, due to the materials used for the base support 315 and/or the shape of the base support 315, the base support 315 can be installed first, then the other electronic components (e.g., electronic component 145) can be installed after the base support 315, followed by the dust seal 310 being placed on or around the base support, and finally the housing wall (e.g., housing wall 355) can be installed to compress the dust seal 310 in an interference fit between the housing wall 355 and the base support 315. In other words, the present exemplary sealing systems and methods facilitate a top or front assembly of the device, while ensuring a secure light and/or dust seal between sections.

Any of the features, components, parts, including the arrangements and configurations thereof shown in FIGS. 7A-7C can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 7A-7C.

To the extent applicable to the present technology, personal information data may be collected that uniquely identifies or can be used to contact or locate a specific person in order to improve the user experience. Any collection of personal information should be conducted in compliance with well-established privacy policies and practices that meet or exceed industry and governmental requirements for privacy and security. However, the present exemplary systems and methods are fully operable without the collection or use of personal information data.

Furthermore, the present description incorporates and details a number of examples and alternatives, many of which are not required to perform the present systems and methods. Additionally, elements of the disclosed examples can be combined or varied from the precise forms disclosed herein. It will be apparent to one of ordinary skill in the art that many modifications and variations are possible in view of the above teachings.

What is claimed is:

1. An electronic device, comprising:

a housing having a first wall and a second wall, the first wall and the second wall defining an enclosure;

a base support disposed in the enclosure and defining a first surface and a second surface opposite the first surface, the first surface coupled to the first wall;

a light emitting component coupled to the second surface; and a seal surrounding the light emitting component and disposed between the base support and the second wall, the second wall being disposed over the base support.

2. The electronic device of claim 1, further comprising an electronic component disposed between the first wall and the second wall, the seal separating the electronic component from the light emitting component.

3. The electronic device of claim 1, wherein:

the base support comprises a ledge;

the seal surrounds an upper portion of the base support and contacts the ledge; and the seal and the base support are engaged in an interference fit.

4. The electronic device of claim 1, the seal comprising a plastic shim that contacts the base support and further comprising a foam material connected to the plastic shim by a pressure sensitive adhesive, the foam material compressed between the plastic shim and the second wall.

5. The electronic device of claim 1, wherein the seal comprises a silicone material.

6. The electronic device of claim 1, wherein the seal obstructs light having wavelengths between about $10^{-8}$ m to about $10^{-3}$ m and inhibits debris from traversing between the base support and the second wall.

7. The electronic device of claim 1, wherein the seal is die cut.

* * * * *